United States Patent
Kumar et al.

(10) Patent No.: US 9,197,549 B2
(45) Date of Patent: Nov. 24, 2015

(54) SERVER LOAD BALANCER TRAFFIC STEERING

(71) Applicant: Cisco Technology, Inc., San Jose, CA (US)

(72) Inventors: Surendra M. Kumar, San Ramon, CA (US); Nagaraj A. Bagepalli, Fremont, CA (US); Wei-Chun Chao, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 249 days.

(21) Appl. No.: 13/748,072

(22) Filed: Jan. 23, 2013

(65) Prior Publication Data

US 2014/0207968 A1     Jul. 24, 2014

(51) Int. Cl.
   *G06F 15/173*    (2006.01)
   *H04L 12/721*    (2013.01)
   *H04L 12/715*    (2013.01)
   *H04L 12/803*    (2013.01)

(52) U.S. Cl.
   CPC .............. *H04L 45/38* (2013.01); *H04L 45/64* (2013.01); *H04L 47/125* (2013.01)

(58) Field of Classification Search
   CPC ................................ H04L 45/38; H04L 45/64
   USPC ................................................... 709/223, 244
   See application file for complete search history.

(56) References Cited

U.S. PATENT DOCUMENTS

| | | | |
|---|---|---|---|
| 7,099,915 B1 | 8/2006 | Tenereillo et al. | |
| 7,272,613 B2 * | 9/2007 | Sim et al. | 709/223 |
| 7,321,926 B1 * | 1/2008 | Zhang et al. | 709/220 |
| 7,752,630 B2 | 7/2010 | Murray et al. | |
| 2012/0066371 A1 | 3/2012 | Patel et al. | |

* cited by examiner

*Primary Examiner* — Adnan Mirza
(74) *Attorney, Agent, or Firm* — Edell, Shapiro & Finnan, LLC

(57) ABSTRACT

A network switch comprises a load balancer steering mechanism configured to receive a service request received from a load balancer and forward the service request to a first server in a load-balanced server cluster. The service request was initiated by a client and transmitted to the load balancer. The network switch is configured to receive return traffic transmitted by the first server, and to automatically steer the return traffic to the load balancer.

23 Claims, 5 Drawing Sheets

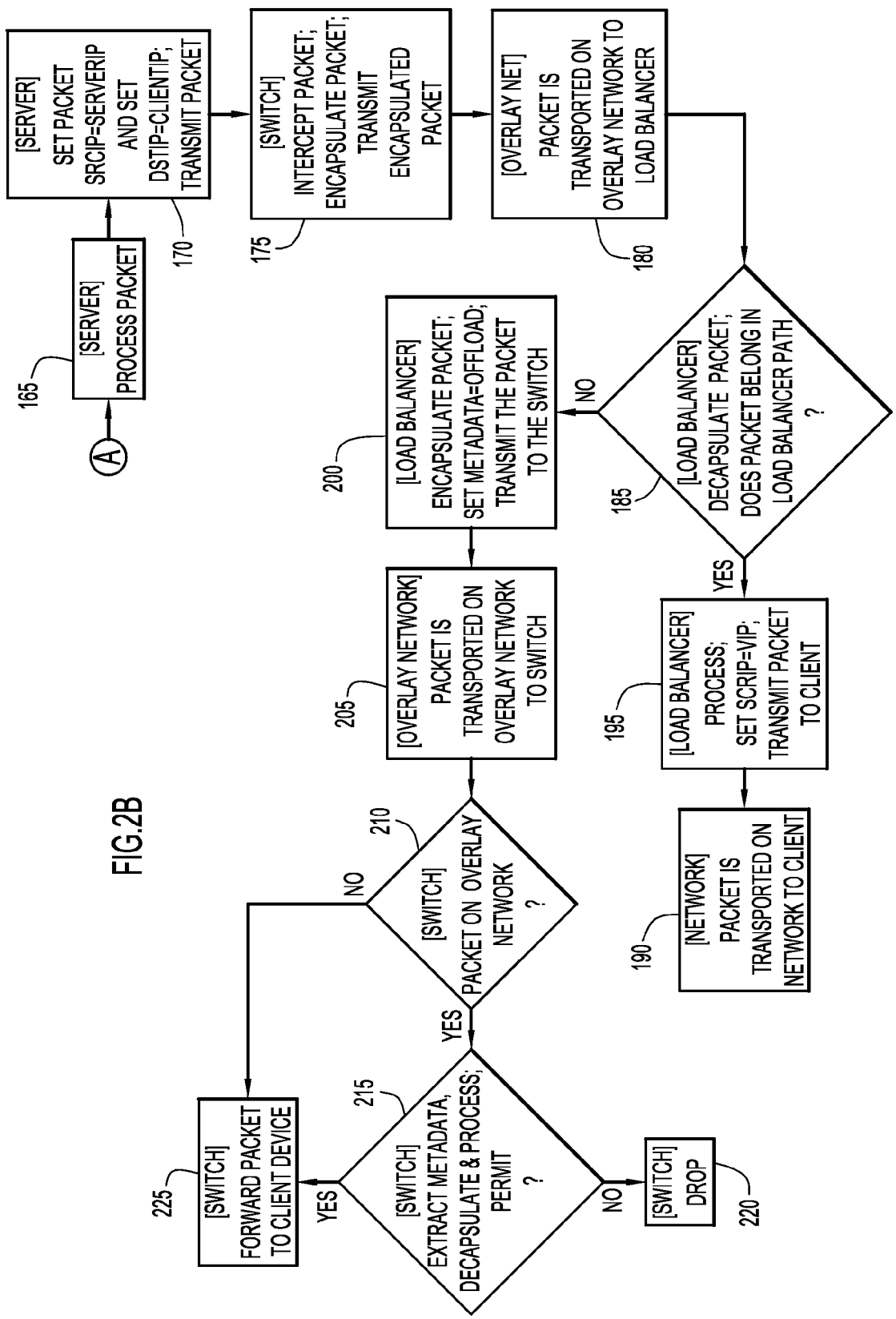

SERVER LOAD BALANCER TRAFFIC STEERING

TECHNICAL FIELD

The present disclosure relates to steering traffic to a load balancer in a computing network.

BACKGROUND

Load balancing is a service used in computer networks to distribute workload (e.g., processing and communications) across a plurality of computing resources, such as servers, computers, network links, processors, etc., in an effort to avoid overloading a particular resource. Distributing the workload across a plurality of resources may provide efficient utilization of the resources, high resource throughput, and a minimization of response time, as needed.

In one particular arrangement, load balancing may be used to mediate/control the distribution of workload across a plurality of servers in a server farm or cluster. In such arrangements, the load balancing is performed by a hardware or software entity that is referred to as a server load balancer (SLB).

BRIEF DESCRIPTION OF THE DRAWINGS

FIGS. 2A and 2B illustrate a flowchart of a load balancer traffic steering method in accordance with examples presented herein.

DESCRIPTION OF EXAMPLE EMBODIMENTS

Overview

A network switch comprises a load balancer steering mechanism configured to receive a service request received from a load balancer and forward the service request to a first server in a load-balanced server cluster. The service request is initiated by a client and transmitted to the load balancer. The network switch is configured to receive return traffic transmitted by the first server, and to automatically steer the return traffic to the load balancer.

Example Embodiments

Figure 1:
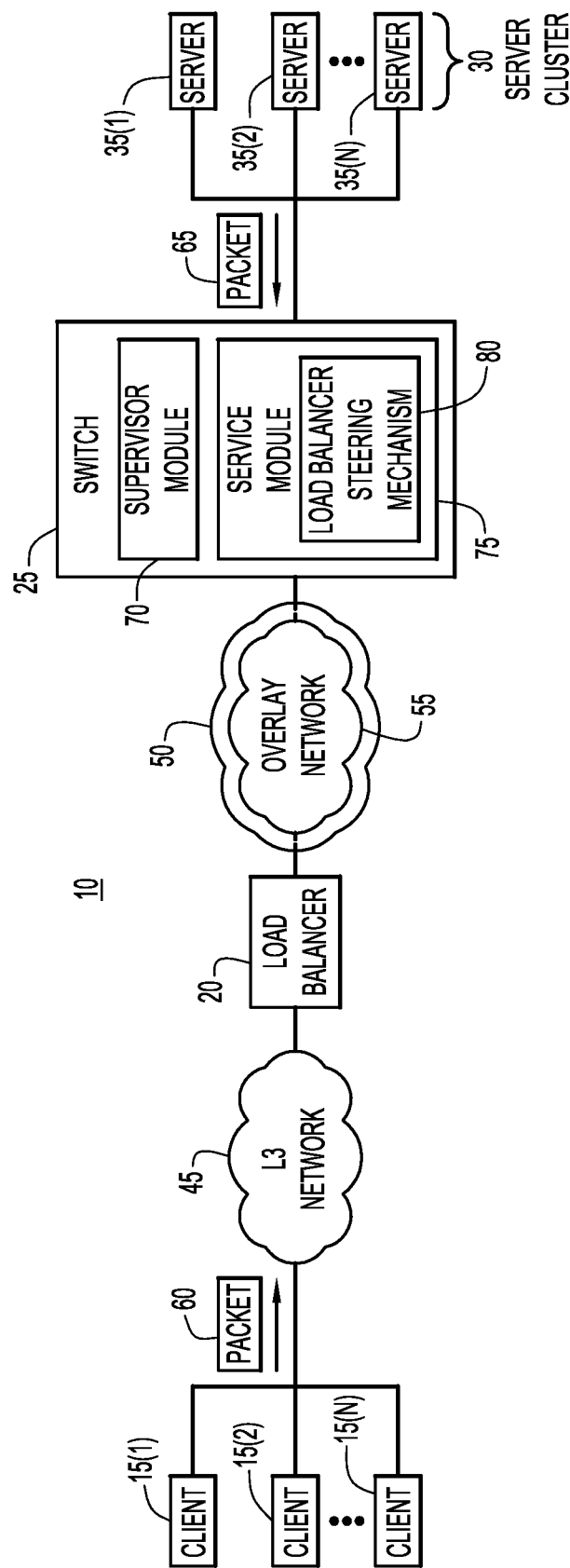
FIG. 1 is block diagram of a computing arrangement configured to perform load balancer traffic steering techniques in accordance with examples presented herein.

FIG. 1 is a block diagram of a computing arrangement 10 in which load balancer traffic steering techniques may be employed. In the example of FIG. 1, the computing arrangement 10 comprises a plurality of clients 15(1)-15(N), a load balancer 20, a network switch 25, and a load-balanced server cluster (server farm) 30. Server cluster 30 comprises a plurality of servers 35(1)-35(N). Servers 35(1)-35(N) may be a plurality of separate physical servers or virtual machines provided on one or more physical computing devices. Clients 15(1)-15(N) may comprise, for example, computers, servers, virtual machines, etc.

Clients 15(1)-15(N) are connected to load balancer 20 via a network 45 that may be a layer 2 (L2) or a layer 3 (L3) network. Load balancer 20 is connected to switch 25 via a network 50 that may also be an L2 or an L3 network. In the example of FIG. 1, networks 45 and 50 are L3 networks that may include any number of switches, routers or other L3 networking devices. For ease of illustration, these L3 networking in networks 45 and 50 have been omitted from FIG. 1. Networks 45 and 50 may be the same network or, for example, logically separate networks.

As shown in FIG. 1, load balancer 20 and switch 25 are configured to communicate with one another via an overlay network 55. Overlay network 55 is a virtual layer that is built on the top of the network 50 so as to link load balancer 20 and switch 25. This link is a logic connection that may extend through one or more networking devices. Further details of overlay network 55 are provided below.

The servers 35(1)-35(N) in server cluster 30 are networked server computers and/or virtual machines that provide services to clients 15(1)-15(N). In certain examples, each server 35(1)-35(N) may have identical software and/or hardware configurations so that service requests from clients 15(1)-15(N) (and thus the resulting workload) can be distributed across the "pool" of servers. The distribution of the workload across the servers 35(1)-35(N) is controlled by load balancer 20. More specifically, when clients 15(1)-15(N) seek service from one or more of the servers 35(1)-35(N), the clients 15(1)-15(N) transmit a service request comprising one or more packets 60 to load balancer 20. Load balancer 20 then determines (e.g., based on current workloads, thresholds, etc.) which of the servers 35(1)-35(N) should receive and process the service request.

In certain circumstances, when load balancer 20 processes and forwards a service request to a server 35(1)-35(N), packets 65 transmitted in response to the service request, referred to herein as return traffic, should be first transmitted to the load balancer 20. That is, the return traffic should pass through the load balancer 20 before being forwarded to the original client (i.e., the client that transmitted the initial service request). The return traffic should be first transmitted to the load balancer 20 due to security issues, load balancer features, to ensure that the load balancer 20 is aware of any changes to the severs 35(1)-35(N), etc.

One conventional scheme to ensure that the return traffic is transmitted to a load balancer is to configure a server-side interface Internet Protocol (IP) address of the load balancer as the default gateway in each of the load-balanced servers. However, this scheme has several drawbacks, including a reliance on a user to make modifications to the configuration of the load-balanced servers and a restriction of the deployment to a routed mode.

Another conventional scheme to ensure that the return traffic is transmitted to a load balancer is to use network address translation (NAT) during processing of the service request and any return traffic. In this scheme, the source IP addresses in the service request packets are each set to the IP address of the original client. The load balancer performs a source NAT (SNAT) operation to replace the original source IP addresses in the service request packets with an IP address of the load balancer. As a result of this modification to the packets, the server that receives the service request is only aware of the IP address of the load balancer and determines that the load balancer is the source of the packet. As such, the return traffic will be transmitted from the server to the load balancer (using the source IP address in the received service request packets). In particular, the return traffic packets will include the IP address of the load balancer as the destination IP address. This scheme avoids modifications to the configuration of the load-balanced servers, but results in the need to perform SNAT operations on the service requests. Additionally, the load-balanced servers may not be aware of the client's IP address, which is used for accounting and security operations.

Another conventional scheme to ensure that the return traffic is transmitted to a load balancer is to configure policy based routing (PBR) on a network switch that is connected between clients and a load balancer. In general, PBR relies on a user to create a number of different routing rules on the switch so that certain classes of traffic are routed to the load balancer while other classes of traffic are not routed to the load balancer. Although this scheme does not involve modification to the configuration of the servers, this scheme involves the installation of classifiers and routes on all the network devices in the path between the server and the load balancer (i.e., all in-path switches and routers). This installation can be labor intensive for a user and can depend on, for example, the number of servers involved, the classifications used, the network configuration, etc.

As such, conventional schemes to ensure that return traffic is transmitted to a load balancer require one or more of: modifying the server configuration, installation of classifiers and routes on all network devices in the path, and/or SNAT operations that result in packet modification. Proposed herein is a scheme to automatically steer return traffic through load balancer 20 without modification to the servers 35(1)-35(N), without installation of classifiers and routes on other in-path network device(s), and without performing SNAT operations to modify the structure of packets in the service requests.

More specifically, in the example of FIG. 1, switch 25, which may be a physical or virtual switch, includes a supervisor module 70 that is part of the switch control plane, and a service module 75 that is part of the switch data plane. The data plane may also include, for example, virtual Ethernet line cards (not shown) that have associated virtual Ethernet ports. Switch 25 uses a logical construct that is referred to as a port-profile. These port-profiles are abstractions that specify network policies which are then applied to the virtual Ethernet ports to which the servers 35(1)-35(N) connect.

At a high level, the service module 75 provides the ability to steer traffic from a given port of the switch 25 to a service node via an overlay network by configuring, among other items, a service node's (service node being the load balancer) IP address in the port-profiles. In particular, the service module 75 includes a load balancer steering mechanism 80 that, as described further below, is configured to automatically steer return traffic to load balancer 20.

FIG. 1 is an illustration that logically represents both a physical and a virtual switch configured to execute examples presented herein. It is to be appreciated that the illustration of supervisor module 70 and service module 75 within a single box or entity is merely for ease of illustration. In practice, the supervisor module 70 and service module 75 may not be implemented together within one entity and may not necessarily have their own physical devices.

Figure 2A:
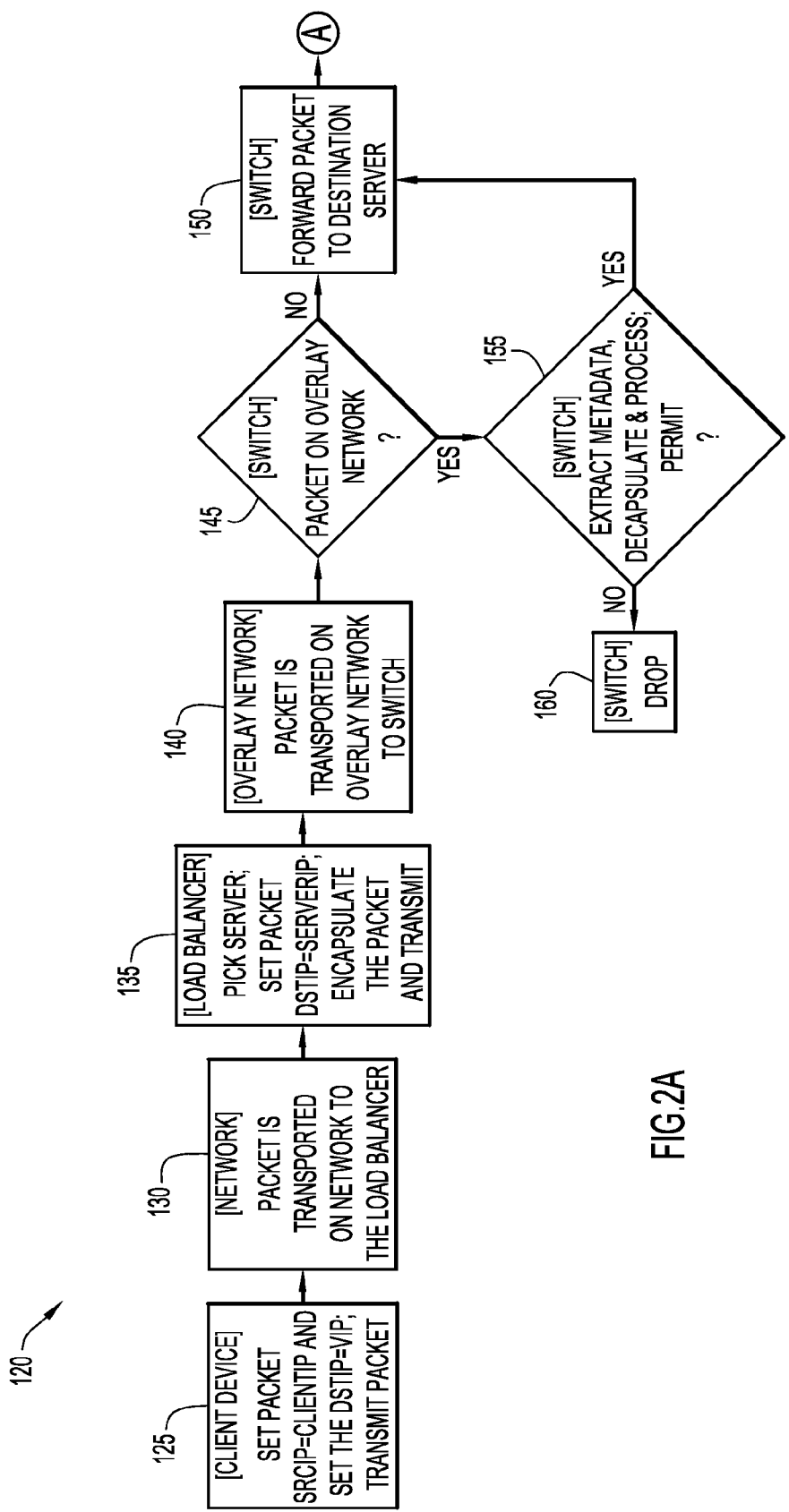

FIGS. 2A and 2B illustrate a flowchart of a method 120 for the use of load balancer steering mechanism 80 in accordance with examples presented herein. For ease of illustration, method 120 will be described with reference to the example arrangement of FIG. 1.

Method 120 begins at 125 where a client, such as client 15(1), generates a service request for transmission to the server cluster 30. The networks 45 and 50 are L3 networks in which the service requests and return traffic are transmitted in the form of packets according to predefined protocols, such as the Transmission Control Protocol/Internet Protocol (TCP/IP). A sequence of packets transmitted from a source device to a destination device is referred to as a network flow. As such, in generating the service request, the client 15(1) generates one or more packets 60 for transmission to a server in the server cluster 30.

As is well known, packets generally comprise control information and actual data (also known as payload). The control information is data that intermediate network devices (e.g., switches, routers, etc.) use to forward the packet from the source to the destination. In L3 networks, the control information includes a source IP address (srcIP) that is the address of the entity that transmits the packet. The control information also includes a destination IP addresses (dstIP) that is the address of the entity that is to receive the packet. As noted above, the client 15(1) does not select which server will receive the service request, but rather the receiving server is selected by load balancer 20. As such, the client 15(1) sets the destination IP address in the packets 60 to be an IP address, such as a virtual IP address (vIP), of the load balancer 20. The source IP address in the packets 60 is set to the IP address of the client 15(1).

At 130, the packets 60 in the service request are transported on the network 45 to load balancer 20. At 135, the load balancer 20 selects which one of the servers 35(1)-35(N) should receive and process the service request. In this example, load balancer 20 selects server 35(1) to receive the service request. After the selection of server 35(1), the load balancer 20 is configured to transmit the service request to switch 25 via overlay network 55. That is, the load balancer 20 is configured to transmit the service request to the network device that is the last hop switch closest to the server 35(1). This switch 25 may be a physical or virtual switch and there may be multiple other switches/routers in the path between the load balancer 20 and the switch 25.

Overlay network 55 is a virtual layer that is built on the top of the network 50 so as to link load balancer 20 and switch 25 via a virtual path segment. As used herein, a virtual path segment is an overlay connection between two overlay "hops" (i.e., overlay network devices) in the service path. To transmit packets on this overlay network 55 the load balancer 20 is configured to encapsulate the packets 60 with an overlay encapsulation. The overlay encapsulation for transmission of packets 60 on overlay network 55 includes one or more transport tunnel encapsulation headers, referred to herein as overlay headers, used to redirect the service request from the load balancer 20 to switch 25 over one or more underlying network segmentation technologies (e.g., Institute of Electrical and Electronics Engineers (IEEE) 802.1Q (Dot1Q), Multiprotocol label switching (MPLS), IP, etc.) and adjacencies. The encapsulation may also include metadata that is used by switch 25 to determine how to process with the packets 60 upon receipt. This metadata may include, for example, policy decision information (e.g., permit the packet or drop the packet directives), information regarding whether subsequent packets on the flow (to which this packet belongs) should be steered back to the load balancer or not, etc.

A virtual path segment may be formed between L2 or L3 adjacent hops and, as such, the encapsulation provided by the load balancer 20 is based on the type of the next data path segment over which the packets are going to be transmitted. That is, if the subsequent path segment comprises only one or more L2 hops, the encapsulation may be an L2 encapsulation. If the subsequent path segment comprises only one or more L3 hops, the encapsulation may be an L3 encapsulation. In the examples of FIGS. 1 and 2, the encapsulation is an L3 encapsulation and the overlay headers for packets 60 may include, among other elements, a source IP address for the virtual path segment and a destination IP address for the virtual path segment. Any in-transit network device (a switch or a router) that happens to be in path of the encapsulated traffic merely forwards the encapsulated packets using the overlay header destination addresses.

At 145, when packets are received at switch 25, the switch first determines if the packets are received on the overlay network 55. If the received packets are not received on the overlay network 55, then at 150 the packets are be forwarded to the destination identified in the packets. However, if the packets are received on the overlay network 55, then at 155 the load balancer steering mechanism 80 decapsulates the packet (i.e., removes the overlay header), extracts any metadata, and processes the packet. The load balancer steering mechanism 80 then determines if forwarding of the packets 60 is permitted.

If the load balancer steering mechanism 80 determines at 155 that the packets 60 are not permitted, then at 160 the packets are dropped. However, if load balancer steering mechanism 80 determines at 155 that the packets 60 are permitted, the packets 60 are forwarded to the server 35(1) selected by the load balancer 20. The decisions at 150 and 160 (as well as other decisions) may be made on a per-flow or flow-boundary basis (i.e., decisions may be made at a per-flow granularity).

The operations of 125 to 160 comprise the client-to-server segment of method 120 because, at 165, the server 35(1) has received the packets 60 and thus the server 35(1) is able to process the service request. The following operations 170 to 225 comprise the server-to-client segment of method 120 because these operations result in the transmission of the return traffic to client 15(1) via load balancer 20. More specifically, at 170, the server 35(1) generates one or more packets 65 that comprise the return traffic. As noted above, FIGS. 1 and 2 illustrate a L3 network example, thus the packets 65 include a source IP address and destination IP address. The source IP address is set to the IP address of server 35(1) (i.e., the server transmitting the packets), while the destination IP address is set to the IP address of the original client 15(1) that transmitted the original service request. The packets 65 are transmitted and, at 175, the packets 65 are intercepted at the load balancer steering mechanism 80 of switch 25. The packet interception at 175 may be made on a per-flow or flow-boundary basis More specifically, the load balancer steering mechanism 80 is configured to automatically steer received server traffic flows (i.e., flows of packets originating from load-balanced server cluster 30) to the load balancer 20 before being forwarded to the client 15(1). In certain examples, load balancer steering mechanism 80 is configured to steer all server traffic flows received at certain ports to the load balancer 20 (i.e., direct all packets received on certain ports linked to servers 35(1)-35(N) onto the load balancer path). In other examples, load balancer steering mechanism 80 is configured to identify received traffic as originating from load-balanced server cluster 30 (i.e., identify the traffic as a server traffic flow) and forward all such identified traffic flows to load balancer 20. The load balancer steering mechanism 80 is configured to identify a server traffic flow in one or more different manners. In the simplest example, load balancer steering mechanism 80 is configured to identify a server traffic flow as all packets received on the port. In another example, classifiers rules could be used to select the traffic that needs to be steered. In such examples, the classifier rules are configured only on the switch 25 that is configured to perform steering decision, and no classifier rules are configured on other in-path network devices. This is in contrast to the above mentioned conventional method that requires classifier rules on all of the other network devices s in the path to the load balancer (i.e., conventional methods require manual configuration of rules on all in-path network devices).

Also at 175, the packets 65 are encapsulated for transmission, and at 180, the packets are transmitted to load balancer 20 on the overlay network 55. At 185, the load balancer 20 decapsulates the packets 65 (i.e., removes the overlay header) and extracts any metadata. The load balancer 20 then determines if the packets 65 belong in the load balancer path (i.e., whether or not the packets are return traffic). [In one example, the load balancer 20 maintains state information for every flow passing there-through. Since all flows from a client 15(1)-15(N) are seen by the load balancer 20, there is state information for the client and, as such, the return traffic on the same flows are easily judged to belong in the load balancer path. Additionally, flows originated by the servers 35(1)-35(N) are not first seen by the load balancer 20 (not return traffic) and, accordingly, can be determined to not belong to the load balancer path. Further, there could be policies on the load balancer 20 that determine whether to deem server originated traffic as still belonging to the load balancer 20 even though it is not seen first in the client-to-server direction.

If it is determined at 185 that the packets 65 are return traffic, then at 190 the load balancer 20 processes the packets 65. The load balancer 20 sets the source IP address in the packets 65 to the virtual IP address of the load balancer and transmits the packets 65 to the client 15(1). At 195, the packets 65 are transported on the network 45 to client 15(1).

Returning to 85, if it is determined that the packets 65 are not return traffic, then at 200 the load balancer 20 re-encapsulates the packets with an overlay header. In this overlay header, the metadata includes an "offload" trigger that is configured to cause future packets associated with packets 65 to be offloaded from (i.e., not forwarded on) the load balancer path. That is, in such examples the load balancer 20 has determined that the received packets 65 do not need to be routed through the load balancer 20 (e.g., packets 65 in this case are not return traffic). Therefore, when the metadata is transmitted to switch 25, the switch 25 will determine that any future packets in a flow associated with packets 65 should not be forwarded to the load balancer 20. As noted above, initially switch 25 is configured to forward all traffic received, for example, at one or more ports to load balancer 20. However, upon receiving an offload trigger, certain packets will no longer be sent to the load balancer 20. As an example, when load balancer 20 receives uninteresting traffic from a server (e.g., one server talking to another server or a server talking to some device on the Internet but not the clients), it can offload the flow to the switch 25. Along with that offload decision, the load balancer can tell the switch how to deal with the packets on the flow. If it is a permit, subsequent packets on the uninteresting flows are not sent up to the load balancer 20 and are switched locally. This saves processing by the load balancer 20 as well as improves end to end time to transport the packet to its destination. In other words, the load balancer 20 can utilize this advanced feature in the switch 25 to offload some of its own processing to the switch 25. Likewise if it is drop, the switch 25 can drop the packet and hence saves the load balancer 20 the trouble of receiving the packets and dropping it itself. These decisions are flow specific and apply only to the packets on the same flow and other flows are not impacted. In other words, the granularity is the flow itself (both forward and reverse flows).

At 205, the encapsulated packets are transmitted on overlay network 55 to switch 25. As noted above, when packets are received at switch 25, the switch first determines if the packets are received on the overlay network 55. This determination is made at 210 and, if the received packets are not received on the overlay network 55, then at 225 the packets are forwarded to the destination identified in the packets. However, if the packets are received on the overlay network 55, then at 215 the load balancer steering mechanism 80 decapsulates the packet (i.e., removes the overlay header), extracts any metadata, and processes the packet. The load balancer steering mechanism 80 then determines if forwarding of the packets is permitted.

If the load balancer steering mechanism 80 determines at 215 that the packets 60 are not permitted, then at 220 the packets are dropped. However, if load balancer steering mechanism 80 determines that the packets are permitted, the packets are forwarded to the client.

Figure 3:
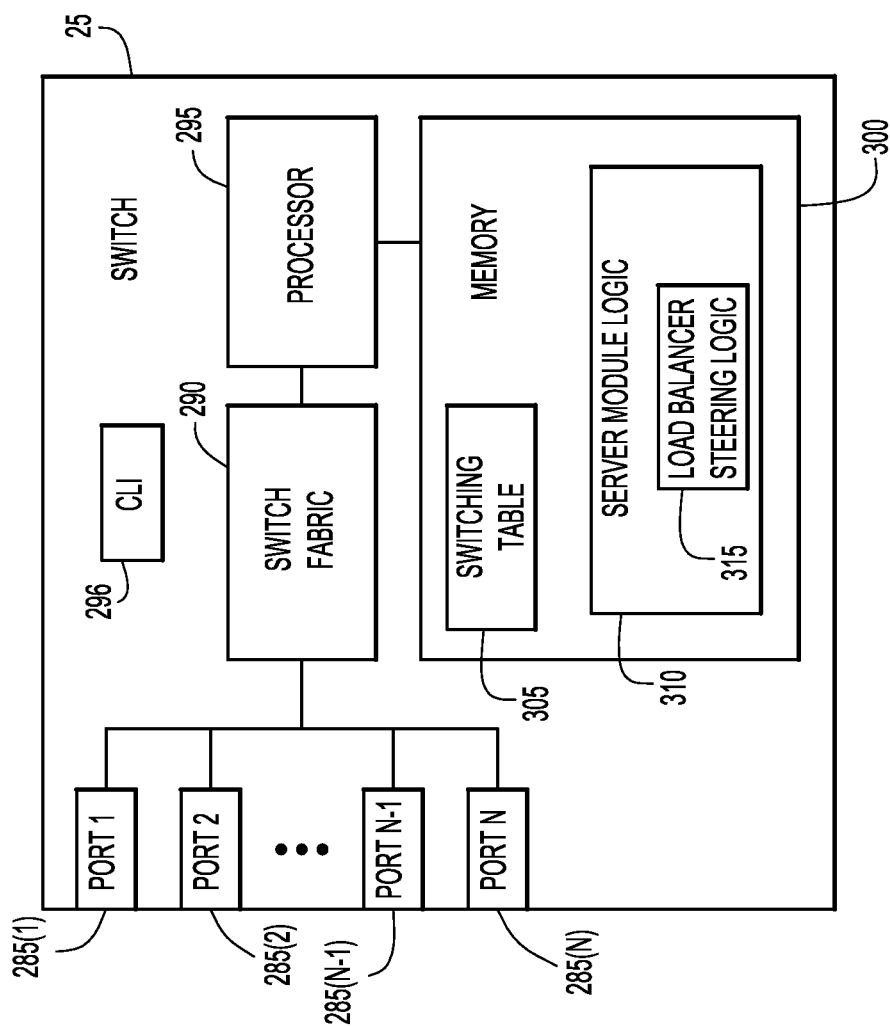
FIG. 3 is a block diagram of a network switch configured to steer traffic to a load balancer in accordance with examples presented herein.

FIG. 3 is a block diagram illustrating one example arrangement of switch 25 configured to automatically steer return traffic to a load balancer in accordance with examples presented herein. As shown, switch 25 comprises a plurality ports 285(1)-285(N), a switch fabric 290, a processor 295, a command-line interface (CLI) 296, and a memory 300. Switch fabric 290 may be embodied by one or more application specific integrated circuits (ASICs) that are configured to process packets for routing among the network ports. Memory 300 comprises a switching table 305, service module logic 310, and load balancer steering logic 315.

It is to be appreciated that a network switch, such as switch 25, may have different arrangements. Although only one example arrangement of switch 25 is shown, it is to be appreciated that techniques described herein may also be implemented in other arrangements. For example, aspects presented herein may be executed in virtual switches as well such switches implemented in the hypervisors in the virtual environment.

In operation, packets are received at a first port 285(1) of switch 25, and then forwarded to a destination via a second port (one of ports 285(2)-285(N)). The switching of packets to a second port is performed by switch fabric 290 and processor 295 through the use of switching table 305 and, in certain examples, service module logic 310 and/or load balancer steering logic 315 as described above with reference to service module 75 and load balancer steering mechanism 80, respectively. Switch 25 includes a CLI 296 that allows users, such as network administrators, to interact with processor 295 and configure service module logic 310 and/or load balancer steering logic 315.

In the example of FIG. 3, service module logic 310 and load balancer steering logic 315 are software processes stored in memory 300. The memory 300 may comprise read only memory (ROM), random access memory (RAM), magnetic disk storage media devices, optical storage media devices, flash memory devices, electrical, optical, or other physical/tangible memory storage devices. Processor 295 is, for example, a microprocessor or microcontroller that executes the instructions for the service module logic 310 and load balancer steering logic 315 stored in memory 300. Thus, in general, the memory 300 may comprise one or more tangible computer readable storage media (e.g., a memory device) encoded with software comprising computer executable instructions and when the software is executed (by processor 295) it is operable to perform the operations described herein in connection with service module 75 (through execution of service module logic 310) and load balancer steering mechanism 80 (through execution of load balancer steering logic 315).

As noted, FIG. 3 illustrates an example in which service module logic 310 and load balancer steering logic 315 each comprise one or more software processes executable from memory 300. It is to be appreciated that the service module logic 310 and load balancer steering logic 315 are not necessarily software, but rather may comprise hardware elements or hardware support.

Figure 4:
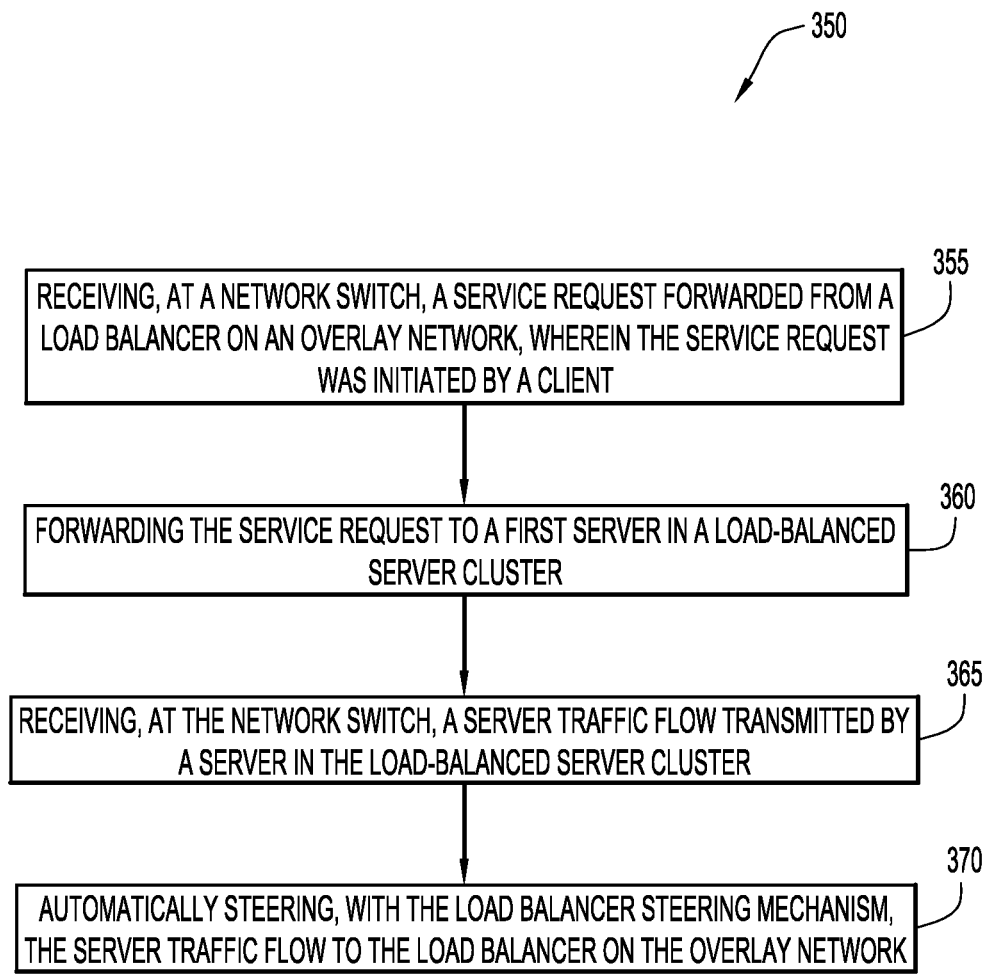
FIG. 4 is a high-level flowchart of a method for load balancer traffic steering in accordance with examples presented herein.

FIG. 4 is a high-level flowchart of a method 350 in accordance with examples presented herein. Method 350 begins at 355 where a network switch receives a service request forwarded from a load balancer on an overlay network. The service request was initiated by a client and transmitted to the load balancer. At 360 the network switch forwards the service request to a first or selected server in a load-balanced server cluster. In other words, the takes the service request off the overlay network and forwards it to a server in the load-balanced server cluster.

At 365, the network switch receives server traffic transmitted by a server in the load-balanced sever cluster. At 370, the load balancer steering mechanism automatically steers the server traffic to the load balancer on the overlay network.

In certain load balancer deployments, return traffic from load-balanced servers should be sent back through the controlling load balancer. Existing schemes involve source NAT and PBR (including automated PBR) for such routing. However, such schemes suffer from involved policy rules/configuration and changes to the switch or NAT configuration in the load balancer. In accordance with examples herein, all traffic received from a load-balanced server cluster at a network switch is steered to a controlling load balancer on an overlay network. The load balancer is then configured to determine if a certain flow should not be sent to the load balancer, and the load balancer configures the switch such that the certain flow is not forwarded to the load balancer.

The above description is intended by way of example only.

What is claimed is:

1. A method comprising:
at a network switch to communicate with a load balancer and a load-balanced server cluster:
receiving a service request forwarded from the load balancer on an overlay network, wherein the service request was initiated by a client;
forwarding the service request to a first server in the load-balanced server cluster;
receiving a server traffic flow transmitted by a server in the load-balanced server cluster;
responsive to an initial configuration of the network switch to steer all traffic flow from the server cluster to the load balancer, automatically steering the server traffic flow to the load balancer on the overlay network;
receiving the server traffic flow back from the load balancer along with an offload indication to signal that the server traffic flow should be offloaded from the load balancer; and
in response to the offload indication, reconfiguring the network switch such that future server traffic associated with the server traffic flow bypasses the load balancer.

2. The method of claim 1, wherein automatically steering the server traffic flow to the load balancer comprises:
determining, on a per-flow basis, whether to steer the server traffic flow to the load balancer.

3. The method of claim 1, wherein automatically steering the server traffic flow to the load balancer comprises:
steering all packets received on certain ports linked to the load-balanced server cluster to the load balancer.

4. The method of claim 1, wherein automatically steering the server traffic flow to the load balancer further comprises:
   encapsulating packets of the server traffic flow with an overlay header.

5. The method of claim 1, wherein packets in the service request received at the network switch are encapsulated with an overlay header to include metadata, and further comprising:
   decapsulating the packets in the service request;
   extracting the metadata from the overlay header; and
   processing the packets in the service request based on the metadata.

6. The method of claim 5, further comprising:
   determining, on a per-flow basis, if forwarding of the packets in the server request is permitted.

7. The method of claim 1, wherein:
   the receiving the server traffic flow back from the load balancer includes receiving the offload indication accompanied by a permit instruction or a deny instruction to instruct the network switch to switch future server traffic associated with the server traffic flow locally at the network switch or drop the server traffic flow at the network switch, respectively.

8. The method of claim 1, further comprising
   determining, at the load balancer, that the server traffic flow is return traffic; and
   forwarding the server traffic flow to a client.

9. The method of claim 1, further comprising
   transmitting, at the load balancer, the service request to the switch on the overlay network without performing source network address translation on packets in the service request.

10. An apparatus comprising:
    a plurality of network ports;
    a memory; and
    a processor configured to:
       receive a service request forwarded from a load balancer on an overlay network, wherein the service request was initiated by a client;
       forward the service request to a first server in a load-balanced server cluster;
       receive a server traffic flow transmitted by a server in the load-balanced server cluster;
       responsive to an initial processor configuration to steer all traffic flow from the server cluster to the load balancer, automatically steer the server traffic flow to the load balancer on the overlay network;
       receive the server traffic flow back from the load balancer on the overlay network along with an offload indication to signal that the server traffic flow should be offloaded from the load balancer; and
       in response to the offload indication, reconfigure the processor such that future server traffic associated with the server traffic flow bypasses the load balancer.

11. The apparatus of claim 10, wherein to automatically steer the server traffic flow to the load balancer, the processor is configured to:
    determine, on a per-flow basis, whether to steer the server traffic flow to the load balancer.

12. The apparatus of claim 10, wherein to automatically steer the server traffic flow to the load balancer, the processor is configured to:
    steering all packets received on certain ports linked to the load-balanced server cluster to the load balancer.

13. The apparatus of claim 10, wherein to automatically steer the server traffic flow to the load balancer, the processor is configured to:
    encapsulating packets of the server traffic flow with an overlay header.

14. The apparatus of claim 10, wherein packets in the received service request are encapsulated with an overlay header to include metadata, and wherein the processor is configured to:
    decapsulate the packets in the service request;
    extract the metadata from the overlay header; and
    process the packets in the service request based on the metadata.

15. The apparatus of claim 14, wherein the processor is configured to:
    determine, on a per-flow basis, if forwarding of the packets in the server request is permitted.

16. The apparatus of claim 10, wherein the processor is configured to:
    receive the offload indication accompanied by a permit instruction or a deny instruction to instruct the processor to switch future server traffic associated with the server traffic flow locally or drop the server traffic flow, respectively.

17. One or more non-transitory computer readable storage media encoded with software comprising computer executable instructions and when the software is executed, by a processor of a network switch, operable to:
    receive a service request forwarded from a load balancer on an overlay network, wherein the service request was initiated by a client;
    forward the service request to a first server in a load-balanced server cluster;
    receive a server traffic flow transmitted by a server in the load-balanced server cluster;
    responsive to an initial configuration of the network switch to steer all traffic flow from the server cluster to the load balancer, automatically steer the server traffic flow to the load balancer on the overlay network;
    receive the server traffic flow back from the load balancer on the overlay network along with an offload indication to signal that the server traffic flow should be offloaded from the load balancer; and
    in response to the offload indication, reconfigure the network switch such that future server traffic associated with the server traffic flow bypasses the load balancer.

18. The computer readable storage media of claim 17, wherein the instructions operable to automatically steer the server traffic flow to the load balancer comprise instructions operable to:
    determine, on a per-flow basis, whether to steer the server traffic flow to the load balancer.

19. The computer readable storage media of claim 17, wherein the instructions operable to automatically steer the server traffic flow to the load balancer comprise instructions operable to:
    steer all packets received on certain ports linked to the load-balanced server cluster to the load balancer.

20. The computer readable storage media of claim 17, wherein the instructions operable to automatically steer the server traffic flow to the load balancer comprise instructions operable to:
    encapsulate packets of the server traffic flow with an overlay header.

21. The computer readable storage media of claim 17, wherein packets in the service request received at the network switch are encapsulated with an overlay header to include metadata, and further comprising instructions operable to:
    decapsulate the packets in the service request;
    extract the metadata from the overlay header; and process the packets in the service request based on the metadata.

22. The computer readable storage media of claim 21, further comprising instructions operable to:
    determine, on a per-flow basis, if forwarding of the packets in the server request is permitted.

23. The computer readable storage media of claim 17, wherein:
    the instructions operable to receive the server traffic flow back from the load balancer include instructions operable to receive the offload indication accompanied by a permit instruction or a deny instruction to instruct the network switch to switch future server traffic associated with the server traffic flow locally at the network switch or drop the server traffic flow at the network switch, respectively.

\* \* \* \* \*